(12) United States Patent
Flatman et al.

(10) Patent No.: US 12,020,487 B2
(45) Date of Patent: Jun. 25, 2024

(54) VEHICLE LIGHTING CONTROL USING IMAGE PROCESSING OF CHANGES IN AMBIENT LIGHT INTENSITY

(71) Applicant: Perkins Engines Company Limited, Peterborough (GB)

(72) Inventors: Michael Flatman, Stamford (GB); Samuel Alec Roberts, Stamford (GB); Thomas Henry Abel, Gateshead (GB); Raymond Alan Wise, Metamora, IL (US); Peter Joseph Petrany, Dunlap, IL (US)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/797,205

(22) PCT Filed: Jan. 28, 2021

(86) PCT No.: PCT/EP2021/025032
§ 371 (c)(1),
(2) Date: Aug. 3, 2022

(87) PCT Pub. No.: WO2021/156002
PCT Pub. Date: Aug. 12, 2021

(65) Prior Publication Data
US 2023/0049522 A1 Feb. 16, 2023

(30) Foreign Application Priority Data
Feb. 3, 2020 (GB) ........................ 2001431

(51) Int. Cl.
*B60R 1/26* (2022.01)
*B60Q 1/14* (2006.01)
(Continued)

(52) U.S. Cl.
CPC ............... *G06V 20/56* (2022.01); *B60Q 1/14* (2013.01); *B60Q 1/30* (2013.01); *B60R 1/26* (2022.01);
(Continued)

(58) Field of Classification Search
CPC ... B60R 1/26; B60Q 1/14; B60Q 1/30; H04N 23/74; H04N 23/71
See application file for complete search history.

(56) References Cited

U.S. PATENT DOCUMENTS

| 6,677,986 B1 | 1/2004 | Pochuller |
| 7,415,338 B2 | 8/2008 | Monji et al. |

(Continued)

FOREIGN PATENT DOCUMENTS

| EP | 2947482 A2 | 11/2015 |
| EP | 3363684 A1 | 8/2018 |

(Continued)

OTHER PUBLICATIONS

International Search Report related to Application No. PCT/EP2021/025032; dated Jun. 28, 2021.

(Continued)

*Primary Examiner* — Rowina J Cattungal

(57) ABSTRACT

Changes in ambient light intensity are detected by processing image data from an image capture device to determine, iteratively, a signal-to-noise ratio of the image data. The signal-to-noise ratio is a ratio of average to variance of pixel values for some of the pixels forming the image. A control output is generated, based on the signal-to-noise ratio, that is responsive to changes in ambient light intensity. The control output is used control a light source of a vehicle.

14 Claims, 4 Drawing Sheets

(51) Int. Cl.
*B60Q 1/30* (2006.01)
*G06V 10/60* (2022.01)
*G06V 20/56* (2022.01)
*H04N 23/56* (2023.01)
*H04N 23/71* (2023.01)
*H04N 23/74* (2023.01)

(52) U.S. Cl.
CPC ............ *G06V 10/60* (2022.01); *H04N 23/56* (2023.01); *H04N 23/71* (2023.01); *H04N 23/74* (2023.01); *B60Q 2300/30* (2013.01); *B60R 2300/10* (2013.01); *B60R 2300/20* (2013.01); *B60R 2300/80* (2013.01)

(56) References Cited

U.S. PATENT DOCUMENTS

| | | | |
|---|---|---|---|
| 8,224,533 B2 | 7/2012 | Furusawa | |
| 9,108,567 B2 | 8/2015 | Foltin | |
| 10,311,599 B2 | 6/2019 | Ali et al. | |
| 11,113,801 B1 * | 9/2021 | Cheng | ........................ G06T 7/20 |
| 2011/0235941 A1 * | 9/2011 | Hamada | ................. H04N 5/213 |
| | | | 382/275 |
| 2012/0150387 A1 * | 6/2012 | Watson | ................ A61B 5/0077 |
| | | | 701/1 |
| 2019/0143908 A1 | 5/2019 | Koravadi | |

FOREIGN PATENT DOCUMENTS

| | | |
|---|---|---|
| EP | 3562145 A1 | 10/2019 |
| KR | 101087741 B1 | 11/2011 |
| KR | 101325791 B1 | 11/2013 |
| KR | 101789074 B1 | 10/2017 |
| WO | 9735743 A1 | 10/1997 |
| WO | 2015176953 A1 | 11/2015 |

OTHER PUBLICATIONS

Great Britain Search Report related to Application No. 2001431.2; dated Jun. 18, 2020.

Laura Mascio Kegelmeyer, et al., "Local Area Signal-to-Noise Ratio (LASNR) algorithm for Image Segmentation", University of California, Lawrence Livermore National Laboratory, 2004, Livermore, CA, USA.

* cited by examiner

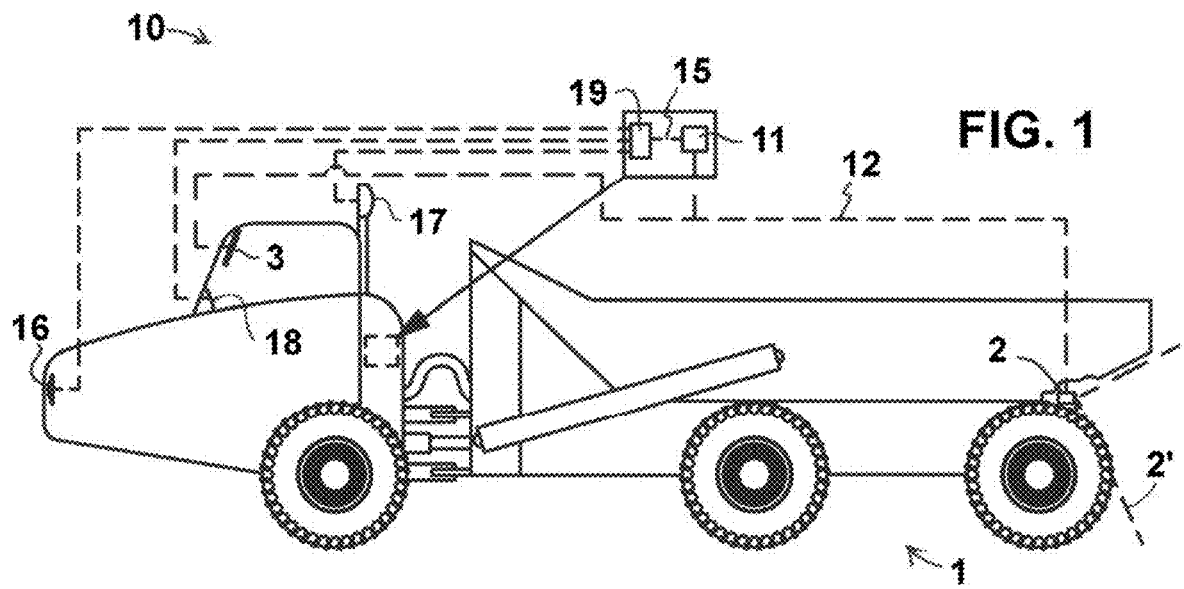
FIG. 1
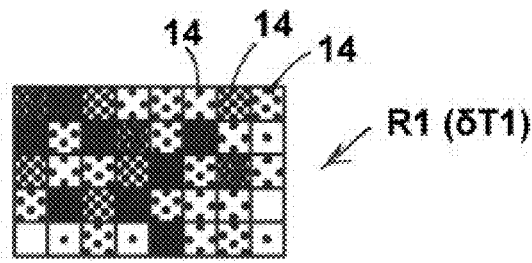
R1 (δT1)
R1 (δT2)
R1 (δT3)
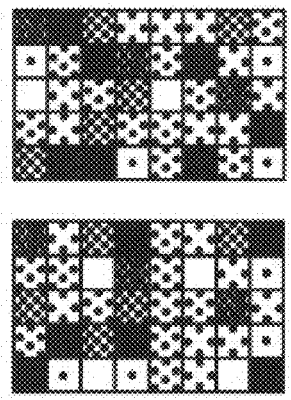
FIG. 2
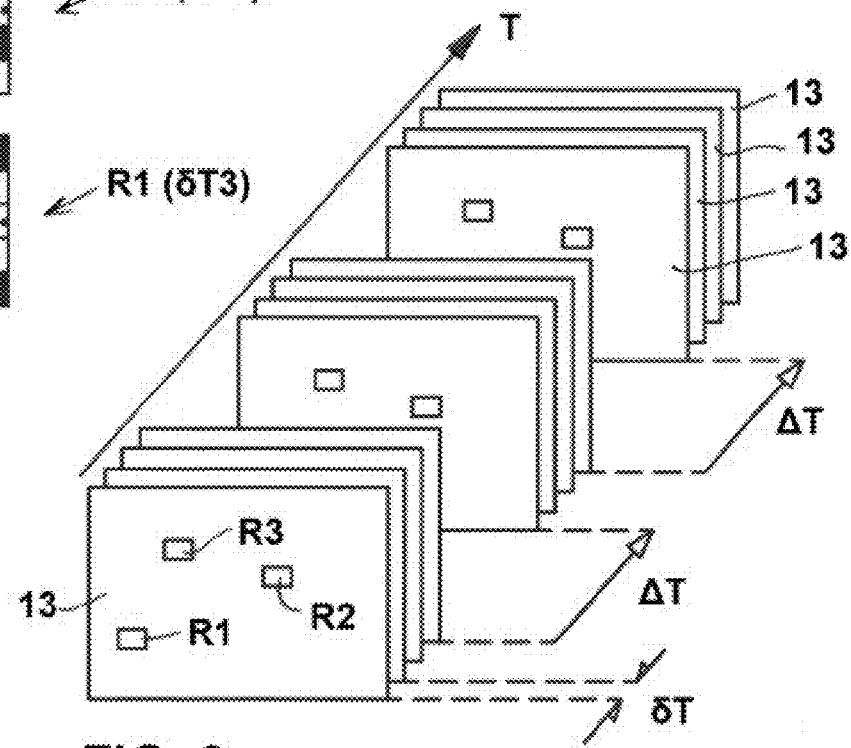
FIG. 3

A FIG. 4
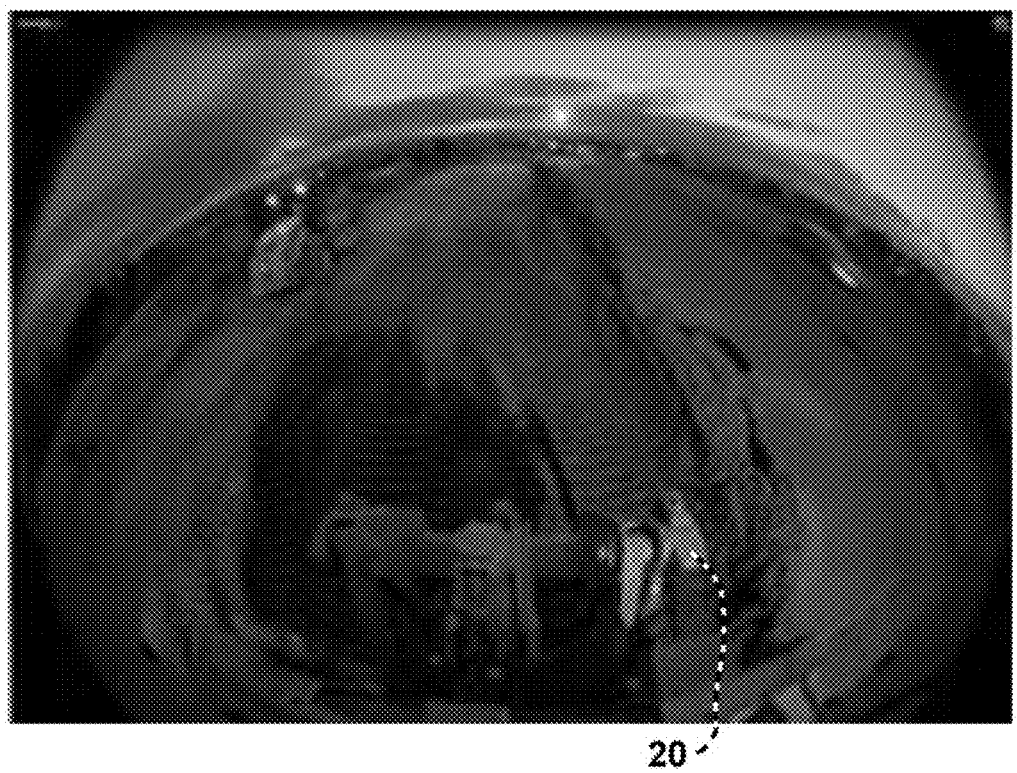
B FIG. 5

C

D

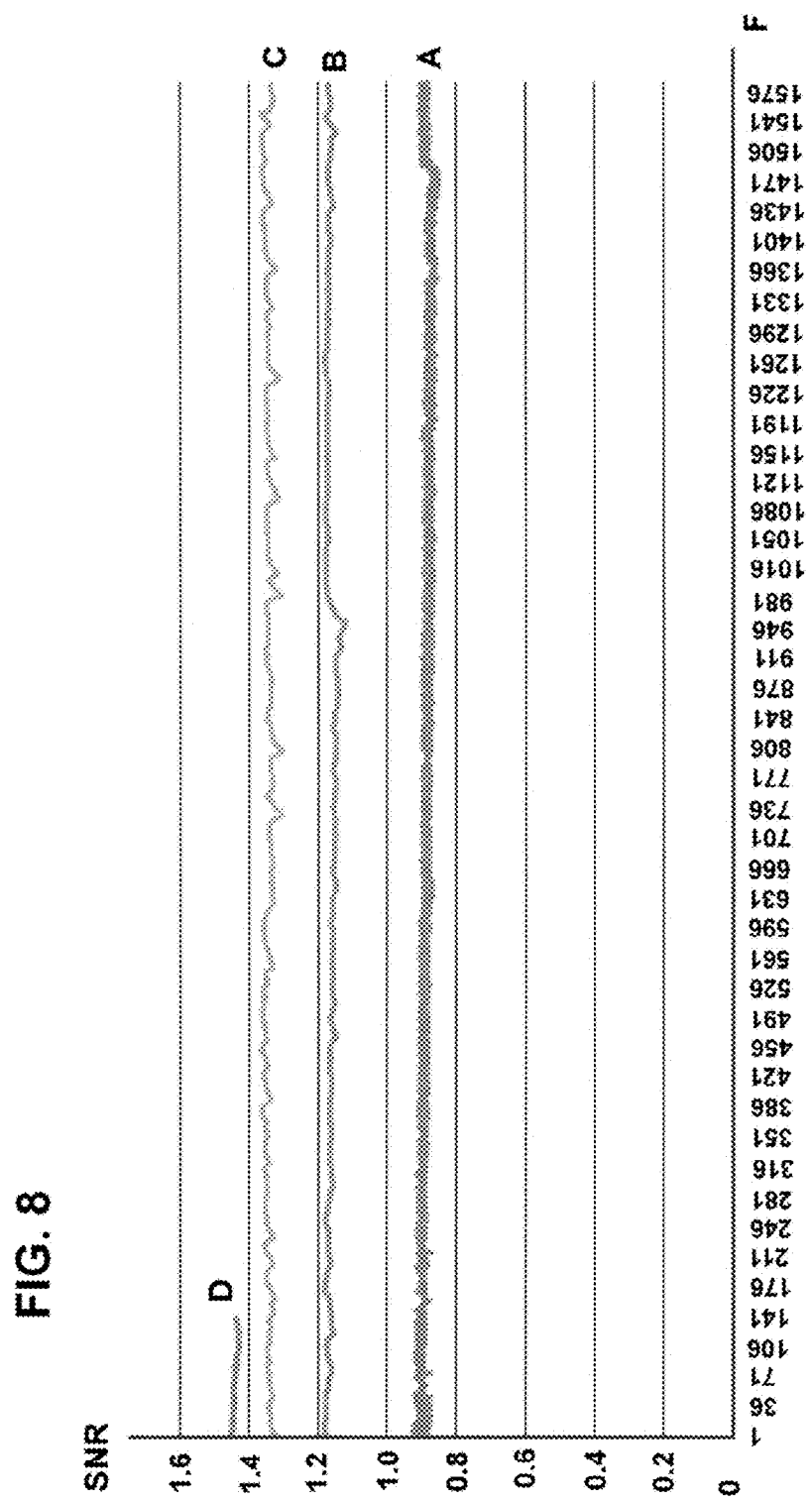

VEHICLE LIGHTING CONTROL USING IMAGE PROCESSING OF CHANGES IN AMBIENT LIGHT INTENSITY

CROSS-REFERENCE TO RELATED APPLICATION

This Application is a 35 USC § 371 US National Stage filing of international Application No. PCT/EP2021/025032 filed on Jan. 28, 2021 which claims priority under the Paris Convention to Great Britain Patent Application No. 2001431.2 filed on Feb. 3, 2020.

BACKGROUND

This disclosure relates to systems for processing image data to detect changes in ambient light intensity.

U.S. Pat. No. 10,311,599B2 describes a mining truck with lights and cameras for imaging an illuminated area. The image is analysed to determine from the proportion of dark pixels whether the lights are working properly. The threshold light intensity for identifying a dark pixel may be selected to distinguish dark objects from objects that are not illuminated.

KR101087741 controlling vehicle headlights responsive using an image from a forward-looking camera. The brightness and exposure gain of different areas of the image are compared with reference values to distinguish day from night, and with one another to detect the presence of a tunnel and turn on the headlights as the vehicle enters the tunnel.

KR101789074 teaches dividing an image into regions, processing each region of the image to obtain a weighted contrast value, and comparing the weighted contrast values to distinguish between day and night.

U.S. Pat. No. 6,677,986B1 teaches averaging pixel brightness in different measurement windows of an image to determine ambient brightness and brightness distribution ahead of a vehicle, e.g. to turn on the vehicle lights when entering a dark tunnel.

When such systems are used on vehicles that operate in an environment in which dark surfaces predominate, for example, in mining operations, it is found that the dark surfaces may result in a false indication of low light intensity.

SUMMARY

Some embodiments of the present disclosure provide an apparatus for detecting changes in ambient light intensity.

The apparatus includes a controller configured to receive image data from an image capture device. The image data represents sequential images of at least a part of a field of view of the image capture device and includes, for each image, a pixel value for each of a plurality of pixels forming the respective image.

The controller is further configured to process the image data to determine, iteratively, a signal-to-noise ratio of the image data. The signal-to-noise ratio is a ratio of average to variance of the pixel values of at least some of the plurality of pixels.

The controller is further configured to generate a control output responsive to changes in ambient light intensity, wherein the control output is based on the signal-to-noise ratio.

In some embodiments, the disclosure provides a vehicle including the apparatus, at least one image capture device mounted on the vehicle for generating the image data, and at least one light source mounted on the vehicle. The control output is arranged to control the at least one light source responsive to changes in ambient light intensity.

In some embodiments, the disclosure provides a method for detecting changes in ambient light intensity.

The method includes receiving image data from at least one image capture device, where the image data represents sequential images of at least a part of a field of view of the at least one image capture device and includes, for each image, a pixel value for each of a plurality of pixels forming the respective image.

The method further includes processing the image data to determine, iteratively, a signal-to-noise ratio of the image data. The signal-to-noise ratio is a ratio of average to variance of the pixel values of at least some of the plurality of pixels.

The method further includes generating a control output responsive to changes in ambient light intensity, wherein the control output is based on the signal-to-noise ratio.

BRIEF DESCRIPTION OF THE DRAWINGS

Further features and advantages will be apparent from the following illustrative embodiments which will now be described, purely by way of example and without limitation to the scope of the claims, and with reference to the accompanying drawings, in which:

FIG. 1 shows a vehicle equipped with an apparatus, according to some embodiments of the present disclosure;

FIG. 2 shows a region of the field of view comprising a plurality of pixels as contained in three sequential images;

FIG. 3 represents a sequence of images;

FIGS. 4, 5, 6 and 7 are four sequential images A, B, C and D respectively of the field of view of a camera mounted on a vehicle; and FIG. 8 shows the signal to noise ratio obtained by processing the image data of the four images A, B, C and D.

Figure 6:

Reference numerals or characters appearing in more than one of the figures indicate the same or corresponding features in each of them.

DETAILED DESCRIPTION

FIG. 1 shows a vehicle 1 including an apparatus 10 for detecting changes in ambient light intensity. The apparatus 10 includes a controller 11 configured to receive image data 12 from at least one image capture device 2, which is arranged to generate the image data and send it to the controller 11. The controller is configured to generate a control output 15 responsive to changes in ambient light intensity, as further discussed below.

The controller 11 may be any device configured to process the image data 12 to generate the control output 15, and may include a processor or CPU and a memory, e.g. RAM, wherein the processor is configured to execute instructions defined by software stored in a non-transitory machine-readable storage medium, e.g. ROM.

As illustrated, the at least one image capture device 2 may be mounted on a vehicle 1 together with the apparatus 10.

The image capture device 2 may be any device capable of detecting light to produce a signal representing a sequence of images. The image capture device 2 may be a camera, which may comprise for example an imaging lens and a charge coupled device. The camera 2 may be a video camera producing the image data in the form of a video feed to the controller 11. The at least one image capture device may comprise a plurality of such devices with different fields of view; for example, to provide images in different directions of the environment of the vehicle. Multiple images could be defined by one camera which captures the images over time, or by multiple cameras (e.g. two or more cameras) each of which captures a different one of the images, either simultaneously or sequentially.

The vehicle 1 may be a wheeled or tracked vehicle, for example, a work vehicle—which is to say, a vehicle configured to carry out work on the environment of the vehicle, e.g. by digging or moving loose material. The vehicle may include a tool mounted on the vehicle, e.g. on a stick or boom and operable, for example, by hydraulic actuators. The vehicle 1 could be configured for use in construction or mining operations. The vehicle could be a rigid or articulated vehicle, for example, an articulated dump truck with a tipping body as shown, or, for example, an excavator or a wheel loader.

The apparatus 10 may include a display 3 which is configured to display images, generated by the at least one image capture device 2, of its field of view 2'. For example, the camera 2 may be arranged to provide a view of the environment around the vehicle, and/or to provide an external view of a part of the vehicle, for example, to monitor its interaction with the environment. The view could be provided to the driver of the vehicle via a display 3 mounted inside the vehicle, and/or to a remote display (e.g. via a wireless data link) to enable other personnel to remotely monitor or control the operation of the vehicle 1. Alternatively or additionally, the camera 2 may provide a signal to a control system configured to control the vehicle 1 responsive to the signal, for example, for autonomous operation of the vehicle. In each case, more than one such camera may be provided.

Thus, a camera 2 which is provided principally to send images to the display 3 may be used also to detect ambient light intensity, to obviate the need to install a separate ambient light sensor.

As illustrated in FIG. 1, the image capture device 2 may include a reversing camera 2, which is to say, a camera whose field of view 2' is positioned behind the vehicle 1. The vehicle 1 may further include a display 3 for displaying images of the field of view 2', i.e. the environment behind the vehicle, generated by the reversing camera 2, to a driver of the vehicle. The display 3 may be operable discontinuously by selecting reverse gear; however, the camera 2 may be arranged to provide a continuous or regular video feed to the controller 11.

The apparatus 10 may include at least one light source, wherein the control output 15 is arranged to control the at least one light source responsive to changes in ambient light intensity.

The light source may be mounted on the vehicle 1 as shown and may include, for example, a headlight, indicator, tail light or other external lighting system 16, an ambient lighting system 17 for illuminating the environment of the vehicle, and/or a light source that illuminates or forms part of a display 18 (e.g. a dashboard display or driver control panel) and/or another internal lighting system of the vehicle 1. The control output 15 could be arranged to turn the or each light source on or off, or to adjust its intensity, responsive to changes in ambient light intensity. For example, the intensity (light output) of the tail lights or internal displays of the vehicle 1 could be reduced with reducing light levels, e.g. at dusk, and increased with increasing light levels, e.g. at dawn, as detected by the apparatus.

The apparatus may include a power control unit 19 for controlling the light source or any other powered system responsive to the control output 15 from the controller 11.

Referring now also to FIGS. 2 and 3, the image data 12 represents sequential images 13 of at least a part of a field of view 2' of the at least one image capture device 2, and includes, for each image 13, a pixel value for each of a plurality of pixels 14 forming the respective image 13. The images 13 may also be referred to as frames, when generated in a rapid sequence to form a video signal. Thus, it will be understood that a moving image as displayed as a live video feed on a screen will include many consecutive images or frames 13 in the sense of this specification. The frames may be captured at short time intervals; for example, at a rate of at least 10 frames per second, typically at least about 24 frames per second.

FIG. 3 shows a sequence of images 13 represented by the image data 12. The images 13 are spaced apart in time T by short reference time periods $\delta T$ and longer periods, which for convenience are referred to as standard reference time periods $\Delta T$.

A standard reference time period $\Delta T$ may be a period of sufficient length to contain, from the point of view of an observer, substantive changes in the content of the image. A standard reference time period $\Delta T$ could be, for example, at least 10 seconds, or at least one minute, or at least 10 minutes, or at least one hour or more in length.

By a short reference time period is meant a time period that contains two or more consecutive images or frames 13, but during which, from the point of view of an observer when the image shows, for example, the work environment of a vehicle, there will be little substantive change in the content of the image. However, over a short reference time period $\delta T$ there may be a change in the individual pixel values of each of the pixels 14, which may be used to define the signal-to-noise ratio as further discussed below. A short reference time period $\delta T$ could be, for example, not more than 0.01 second, or not more than 0.1 second, or not more than 1.0 second in length.

The pixel value may be referred to as the numerical pixel value or pixel intensity. For example, in a greyscale image, the pixel value or pixel intensity may be represented on a standard scale from 0 to 255, wherein a pixel intensity of 0 corresponds to a black pixel, and a pixel intensity of 255 corresponds to a white pixel. In a colour RGB image, each of the three colour components is represented similarly on a scale from 0 to 255, so that a pixel intensity value of 0,0,0 corresponds to a black pixel, and a pixel intensity of 255, 255, 255 corresponds to a white pixel.

For colour images the signal value for each pixel can be calculated based on the R, G and B values for each pixel. For example, for any one pixel, its R, G and B values could be processed individually, or could be averaged to give the intensity or pixel value on a scale from 0 to 255, or could be summed to give the intensity or pixel value on a scale from 0 to 765.

The pixel value or intensity for each pixel could also be expressed for example on a scale from 0 to 1, wherein a value of 0 corresponds to a black pixel, and a value of 1 corresponds to a white pixel. A grey pixel of median intensity would have a value of 0.5.

By way of example, FIG. 2 shows three instances of one region R1 of an image 13, which comprises a matrix of 8×5 pixels 14 with different pixel values from 0 to 1 as represented by the shading.

The controller 11 is configured to process the image data 12 to determine, iteratively, a signal-to-noise ratio of the image data 12. The control output 15 is based on the signal-to-noise ratio—which is to say, the control output 15 is generated responsive to changes in the signal-to-noise ratio which represent changes in ambient light intensity.

By iteratively determining the signal-to-noise ratio for successive images 13 over time, the level (intensity) of ambient light (e.g. daylight) can be monitored and so changes can be detected. For example, the signal-to-noise ratio may be calculated continuously or at predefined time intervals.

The controller 11 may be configured to determine the signal-to-noise ratio iteratively over a standard reference time period $\Delta T$, and to generate the control output 15 responsive to a change in the signal-to-noise ratio, only if the change persists over the standard reference time period.

The standard reference time period $\Delta T$ could be, for example, at least one second, or at least ten seconds, or at least one minute, or at least ten minutes. This can help eliminate false responses due to transient conditions. The period can be selected depending on the application of the apparatus—for example, a relatively long standard reference time period $\Delta T$ may be selected to determine the transition from day to night.

The control output 15 may be a change in the value of a continuous or regularly repeated signal that reflects the signal-to-noise ratio. Thus, a change in the value of the signal forming the control output 15 reflects a change in the signal-to-noise ratio, corresponding to a change in the ambient light intensity.

Alternatively, the control output 15 may be a signal that is generated only in response to a change in the signal-to-noise ratio, corresponding to a change in the ambient light intensity. For example, the control output 15 could be a binary signal for turning a light source or other system on or off responsive to changes in ambient light intensity.

In each case, the control output 15 may be generated when the signal-to-noise ratio changes, or when it changes beyond a predefined threshold range of values (e.g. by a predefined proportion of its previously calculated value), indicating a corresponding change in ambient light intensity.

Alternatively, the control output 15 may be generated when the signal-to-noise ratio changes to a value above or below a predefined threshold value, corresponding to a predefined threshold value of ambient light intensity.

The control output 15 may be generated responsive to the signal-to-noise ratio falling below the predefined threshold value, or alternatively, responsive to the signal-to-noise ratio rising above the predefined threshold value.

For example, the control output 15 may be arranged to turn on at least one light source responsive to the signal-to-noise ratio falling below the predefined threshold value, indicating a low ambient light intensity, and/or to turn off the at least one light source responsive to the signal-to-noise ratio rising above the predefined threshold value, indicating a higher ambient light intensity.

In accordance with the disclosure, the signal-to-noise ratio is defined as a ratio of average to variance of the pixel values—which is to say, the ratio of average pixel value to variance in pixel value—of at least some of the plurality of pixels 14. The at least some of the plurality of pixels on which the calculation is based may include all of the pixels 14 forming each image 13 captured by the camera 2, or only those pixels 14 forming a selected region or regions R1, R2, R3 of the image 13, which regions may be predefined or dynamically defined by the controller 11, as shown in FIG. 3 and further discussed below.

For the purposes of the calculation, the average pixel value may be represented by the arithmetic mean, and the variance in pixel value may be represented by the standard deviation.

Thus, based on the numerical pixel value of each pixel in a group of pixels, the signal-to-noise ratio for the group of pixels may be calculated according to the formula:

Signal-to-noise ratio=(average pixel value)/(standard deviation)

The pixel values may be defined for the purpose of the calculation in either a spatial domain or a time domain, as further explained below.

It will be appreciated that the signal-to-noise ratio is a different parameter from contrast. Contrast is defined as the difference between the maximum and minimum signal value, thus:

Contrast=(maximum pixel value)−(minimum pixel value); and

Contrast is a measure of how pixel intensity varies across an image.

As illustrated in FIG. 3, at least one region R1, R2, R3 may be selected from the field of view of the image capture device 2 to define the at least some of the plurality of pixels 14 for the purpose of the calculation, wherein at least one region R1, R2, R3 represents less than all of the field of view 2'.

Where the at least some of the pixels 14 are defined within such a region or regions, the controller may be configured to determine the signal-to-noise ratio in a temporal domain, as the ratio of average to variance of different pixel values for each pixel 14 of said at least some of the plurality of pixels, over a plurality of sequential images of the selected at least one region, over a short reference time period $\delta T$.

That is to say, the average and variance are determined by comparing the value of each pixel 14 in the selected one or more regions R1, R2, R3 in a first image 13 with the value of that same pixel 14 in one or more subsequent images 13 to calculate the signal-to-noise ratio.

Illustrating this principle, FIG. 2 shows a group of forty pixels 14 forming the region R1 of the image 13 as shown in FIG. 3 in three sequential frames or images 13, which is to say, the same pixels 14 as defined at three successive short time intervals $\delta T$, indicated respectively as R1 ($\delta T1$), R1 ($\delta T2$), and R1 ($\delta T3$). It can be seen that the pixel values, represented by the shading of each pixel, vary substantially between adjacent pixels and also fluctuate rapidly over time, which is characteristic of the low signal-to-noise ratio or "pepper-and-salt" image quality obtained in poor ambient light conditions, as further discussed below under the heading "Industrial Applicability".

Where the at least some of the pixels 14 are defined within such a region or regions, the at least one region R1, R2, R3 may include a reference surface 20 which forms a constant element of the field of view 2'.

For example, where as illustrated the apparatus 10 is arranged on a vehicle, the field of view 2' of the at least one image capture device 2 may include a reference surface 20 defined by a part of the vehicle 1.

Where at least one light source is provided, the at least one light source may be arranged to illuminate the reference surface 20 defined by this part of the vehicle 1, as shown in FIG. 4. In this case, the controller 11 may further be configured to monitor the operation of the vehicle lights by reference to the pixel values of the pixels 14 contained in the region R1, R2, R3 of the image 13 that is occupied by the reference surface 20. For example, the controller 11 may carry out an additional operation to compare said pixel values before energising the light source with the same pixel values after energising the light source.

As an alternative to calculating the signal-to-noise ratio in a temporal domain, the controller may be configured to determine the signal-to-noise ratio for each of the images 13 in a spatial domain, as the ratio of average to variance across the at least some of the plurality of pixels 14.

Each image 13 may be an image of all of the field of view 2'. In this case, the at least some of the plurality of pixels on which the signal-to-noise ratio calculation for that image 13 is based, may include all of the plurality of pixels 14 forming that respective image 13.

Alternatively, at least one region R1, R2, R3 may be selected from the field of view to define the at least some of the plurality of pixels, the at least one region R1, R2, R3 representing less than all of the field of view 2', as illustrated in FIG. 3.

For example, as illustrated in FIG. 2, the signal-to-noise ratio may be calculated for the image 13 at a single point in time, represented by the region R1(δT1), based on the average and variance of the pixel values of the forty pixels 14 in the selected region R1.

Where at least one region R1, R2, R3 is selected, then irrespective of whether the signal-to-noise ratio is calculated in a time domain or a spatial domain, the at least one region may be pre-defined or may be selected by the controller 11 responsive to processing the received image data, as further discussed below.

The image capture device 2 may be configured to send the image data 12 to the controller 11 for part or all of its field of view 2'. For example, where at least one region R1, R2, R3 is predefined, the image capture device 2 may be configured to send the image data 12 to the controller 11 only for that at least one region, or alternatively for the entire image of the entire field of view 2'.

The or each region R1, R2, R3 may be selected as a predefined area of the image (e.g. a predefined group of pixels 14 in the image, corresponding to a predefined area in the field of view 2' of the camera) before the image 13 is processed.

A predefined area of the image 13 could be selected based on a predefined component of the corresponding area in the field of view 2'. The component could be, for example, the sky, which in a normal use position of the vehicle 1 will appear in that area of the field of view 2'. As mentioned above, the component could be for example a reference surface 20 forming part of the vehicle 1 which will appear in that area of the field of view.

The controller may be configured to process the image data 12 representing images 13 received from the image capture device 2, in accordance with an algorithm, to define the at least one region R1, R2, R3 of the field of view 2', based on a spatial distribution of different pixel values in the received images 13.

In this case it will be understood that the at least one region R1, R2, R3 defines the at least some of the plurality of pixels for the purpose of calculating the signal-to-noise ratio, and represents less than all of the field of view 2'.

The algorithm may be, for example, a watershed algorithm as well known in the art of image processing, and will not be further discussed.

After segmenting the image in this way, the signal-to-noise ratio may be calculated for the or each region R1, R2, R3 defined by the algorithm.

Alternatively, one or more regions R1, R2, R3 defined by the algorithm may be selected, and the signal-to-noise ratio calculated for the or each region so selected. The one or more regions may be selected, either as part of the segmenting step which defines the regions, or as a separate step after the segmenting step.

The one or more regions R1, R2, R3 may be selected by processing the pixel values of each region identified by the algorithm to identify regions having pixel values that correspond to a predefined threshold value—for example, regions of high intensity or regions of low intensity. For example, the signal-to-noise ratio may be calculated for regions selected as having high intensity (high pixel values) over a predefined threshold.

Alternatively or additionally, the one or more regions R1, R2, R3 may be selected by comparing the pixel values of the different regions of the image identified by the algorithm to identify regions having similar or different pixel values. For example, the signal-to-noise ratio may be calculated for regions selected as having different intensity (which is to say, the regions have different average pixel values when the pixel values of each region are averaged over the respective region).

If calculated for more than one region of an image 13 or of multiple images 13 from one or more image capture devices 2, the calculated signal-to-noise ratio for each region R1, R2, R3 may be averaged across the regions R1, R2, R3, or compared with that of the other regions R1, R2, R3.

In summary, changes in ambient light intensity may be detected by processing image data 12 from an image capture device 2 to determine, iteratively, a signal-to-noise ratio of the image data 12, wherein the signal-to-noise ratio is a ratio of average to variance of the pixel values of at least some of the pixels 14 forming the image 13. A control output 15 is generated, based on the signal-to-noise ratio, responsive to changes in ambient light intensity.

Thus, in accordance with a method, image data 12 is received from at least one image capture device 2, wherein the image data 12 represents sequential images 13 of at least a part of a field of view 2' of the at least one image capture device 2, and includes for each image 13 a pixel value for each of a plurality of pixels 14 forming the respective image 13. The image data 12 is processed to determine, iteratively, a signal-to-noise ratio of the image data 12, wherein the signal-to-noise ratio is a ratio of average to variance of the pixel values of at least some of the plurality of pixels 14. The control output 15 is generated responsive to changes in ambient light intensity, wherein the control output 15 is based on the signal-to-noise ratio.

In alternative embodiments, the apparatus could be arranged other than on a vehicle. Many further adaptations are possible within the scope of the claims.

INDUSTRIAL APPLICABILITY

The present disclosure recognises that signal-to-noise ratio may be used as a more reliable indicator of ambient light conditions than other parameters, such as contrast, particularly in situations where the image is dominated by dark surfaces, for example, a coal seam, a mine face, a worksite and/or the like.

In such a situation, the pixel value of each pixel (or selected groups of pixels) of the image might be processed to determine that there is low contrast—which is to say, most or all of the pixels of the image, or of each group, have a similar, low pixel value. A similar result might be obtained from a relatively lighter coloured surface in conditions of low ambient light. Thus, relying on contrast might give a false indication of low ambient light levels where the image is dominated by a dark surface such as a coal seam.

It has been found that the signal-to-noise ratio can better discriminate between such images. In good ambient light conditions, a dark surface such as a coal seam will tend to produce a relatively lower signal-to-noise ratio than each of the same surface, and a lighter surface, in poor ambient light conditions.

In poor ambient light conditions, the image will tend to exhibit a grainy character, also referred to as a "pepper-and-salt" effect because of the random juxtaposition of adjacent, lighter and darker pixels throughout the image. Even where the overall pixel intensity of the image is low—for example, where the whole image is dominated by a dark surface— good ambient light conditions result in a more uniform pixel intensity, so that adjacent pixels tend to have a similar, low pixel intensity—yielding a uniform, dark image as opposed to the "pepper-and-salt" effect observed from a comparable image of the same surface in low light conditions.

Figure 7:

By way of example, FIGS. 4-7 show four sequential images 13, designated respectively as A, B, C and D, generated by a camera 2 mounted on a work vehicle 1. The images are spaced apart in time by long time periods of at least about half an hour to one or more hours.

Each image A, B, C, D corresponds to frame no. 1 in a sequence of frames F taken over a much shorter time period, the frames being numbered in a sequence as shown in the graph of FIG. 8. By a frame F is meant an image 13. About 1576 frames were generated by the camera 2 over each of the four discrete time periods covered by the graph. For each data point, the image data of all of the pixels 14 forming one individual frame F (so, for frame no. 1 in the sequence of frames F, the data of the entire image A, B, C or D respectively) was analysed using the spatial domain method to generate the signal-to-noise ratio SNR which is plotted on the graph on a scale from 0-1.6.

As can be seen, the four different time periods commencing respectively with images A, B, C and D were spaced apart in sequence over a part of a day which began at sunrise (image A) and ended in full daylight (image D), in an open work environment where dark surfaces predominate. The four traces A, B, C and D are defined by the four data sets starting with images A, B, C and D respectively. (Trace D is relatively short because the recording was interrupted during the test. The text that appears in trace D is an artefact of the camera and not relevant to this disclosure.)

Despite the dark surfaces, each trace shows a signal which is consistent over the time period of the graph and, moreover, is clearly distinguished from the other traces. As can be seen, images A, B, C and D represent progressively increasing ambient light levels in the environment of the work vehicle 1, while the traces A, B, C and D show a progressively increasing signal-to-noise ratio SNR.

In the claims, reference numerals and characters are provided in parentheses, purely for ease of reference, and should not be construed as limiting features.

The invention claimed is:

1. An apparatus for detecting changes in ambient light intensity, comprising:
a controller configured to;
receive image data from at least one image capture device, the image data representing sequential images of at least a part of a field of view of the at least one image capture device and including for each image a pixel value for each of a plurality of pixels forming the respective image;
process the image data in accordance with an algorithm to define at least one region of the field of view based on a spatial distribution of different pixel values in the received images, wherein the at least one region defines at least some of the plurality of pixels and represents less than all of the field of view;
process the image data of the at least one region to determine iteratively a signal-to-noise ratio of the image data, wherein the signal-to-noise ratio is a ratio of average to variance of the pixel values of at least some of the plurality of pixels; and
generate a control output responsive to changes in ambient light intensity, wherein the control output is based on the signal-to-noise ratio.

2. The apparatus according to claim 1, including at least one light source, wherein the control output is arranged to control the at least one light source responsive to changes in ambient light intensity.

3. The apparatus according to claim 1, including a display configured to display images of the field of view, generated by the at least one image capture device.

4. The apparatus according to claim 1, wherein at least one region is selected from the field of view to define said at least some of the plurality of pixels, the at least one region representing less than all of the field of view.

5. The apparatus according to claim 4, wherein the at least one region includes a reference surface forming a constant element of the field of view.

6. The apparatus according to claim 4, wherein the controller is configured to determine the signal-to-noise ratio in a temporal domain, as the ratio of average to variance of different pixel values for each pixel of said at least some of the plurality of pixels, over a plurality of sequential images of the selected at least one region, over a short reference time period.

7. The apparatus according to claim 1, wherein the controller is configured to determine the signal-to-noise ratio in a spatial domain, as the ratio of average to variance across said at least some of the plurality of pixels, for each of the images.

8. The apparatus according to claim 7, wherein at least one region is selected from the field of view to define said at least some of the plurality of pixels, the at least one region representing less than all of the field of view.

9. The apparatus according to claim 7, wherein each image is an image of all of the field of view, and for each image, said at least some of the plurality of pixels include all of the plurality of pixels forming the respective image.

10. The apparatus according to claim 1, wherein the controller is configured to determine the signal-to-noise ratio iteratively over a standard reference time period, and to generate the control output responsive to a change in the signal-to-noise ratio, only if the change persists over the standard reference time period.

11. A vehicle including an apparatus according to claim 1, at least one image capture device mounted on the vehicle for generating the image data, and at least one light source mounted on the vehicle, wherein the control output is arranged to control the at least one light source responsive to changes in ambient light intensity.

12. The vehicle according to claim 11, wherein the at least one image capture device includes a reversing camera, the field of view of the reversing camera being positioned behind the vehicle, the vehicle further including a display for displaying images of the field of view, generated by the reversing camera, to a driver of the vehicle.

13. The vehicle according to claim 11, wherein the field of view of the at least one image capture device includes a part of the vehicle.

14. The vehicle according to claim 13, wherein the at least one light source is arranged to illuminate said part of the vehicle.

\* \* \* \* \*